United States Patent [19]
Friedrich et al.

[11] Patent Number: 6,003,079
[45] Date of Patent: *Dec. 14, 1999

[54] SYSTEM AND METHOD FOR CONTINUOUSLY MEASURING QUALITY OF SERVICE IN A FEDERATED APPLICATION ENVIRONMENT

[75] Inventors: Richard J. Friedrich, San Jose, Calif.; Jerome Rolia, Ottawa, Canada

[73] Assignee: Hewlett Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,073

[22] Filed: Feb. 27, 1997

[51] Int. Cl.$^6$ .................................................. H04B 3/46
[52] U.S. Cl. ........................ 709/224; 709/105; 709/106; 709/223
[58] Field of Search ...................... 395/200.49, 200.48, 395/200.54, 184.01; 702/186, 176; 709/219, 218, 224, 223, 226, 105, 106, 107

[56] References Cited

U.S. PATENT DOCUMENTS

| | | | |
|---|---|---|---|
| 4,849,879 | 7/1989 | Chinnaswamy . | |
| 5,175,843 | 12/1992 | Casavant et al. | 395/500 |
| 5,303,166 | 4/1994 | Alamlfitano et al. | 702/186 |
| 5,375,070 | 12/1994 | Hershey et al. | 709/224 |
| 5,446,874 | 8/1995 | Wacawsky et al. | 714/1 |
| 5,537,542 | 7/1996 | Ellert et al. | 790/201 |
| 5,553,235 | 9/1996 | Chen et al. | 714/20 |
| 5,694,548 | 12/1997 | Baugher et al. | 709/227 |
| 5,731,991 | 3/1998 | Kinra et al. | 702/186 |
| 5,778,172 | 7/1998 | Riedle et al. | 713/201 |
| 5,790,425 | 8/1998 | Wagle | 709/218 |
| 5,799,154 | 8/1998 | Kuriyan | 709/223 |
| 5,819,066 | 10/1998 | Bromberg et al. | 707/102 |
| 5,857,076 | 1/1999 | Schmidt | 709/224 |

OTHER PUBLICATIONS

Friedrich R. et al., "Integration of Performance Measurement and Modeling for Open Distributed Processing", 1995, pp. 347–358., Open Distributed Processing Experience with Distributed Environments. Proceedings of the 3rd IFIP TC 6/WG 6.1 International Conference on Open Distributed Processing.

Menasce, Daniel A. "Capacity Planning and Performance Modeling From Mainframes to Client Server Systems", 1994.

*Primary Examiner*—Zarni Maung
*Assistant Examiner*—Jason D. Cardone

[57] ABSTRACT

A system and method for measuring quality-of-service in a federated application environment is described. One or more administrative domains are provided with each administrative domain being interconnected with at least one other administrative domain to form the federated application environment. One or more interconnected network nodes are situated within each administrative domain with each network node including at least one capsule interface within which a managed method is executed. Instrumentation is associated with each capsule interface of each network node with the instrumentation collecting performance data on the managed method being executed within the capsule interface. A count sensor determines a processing time with the instrumentation within the capsule interface for each managed method. A network sensor determines send and receive bandwidth demand information with the instrumentation within the capsule interface for each managed method. A demand sensor determines physical host resource demands as needed to satisfy invocations of the managed method with the instrumentation within the capsule interface for each managed method. An interval sensor determines response times with the instrumentation within the capsule interface for each managed method. A display displays the throughput metrics, bandwidth demand metrics, service demand metrics and response time metrics.

19 Claims, 5 Drawing Sheets

SYSTEM AND METHOD FOR CONTINUOUSLY MEASURING QUALITY OF SERVICE IN A FEDERATED APPLICATION ENVIRONMENT

CROSS-REFERENCE TO RELATED APPLICATION

This patent application is related to a commonly-assigned patent application entitled "SYSTEM AND METHOD FOR EFFICIENTLY MONITORING QUALITY OF SERVICE IN A DISTRIBUTED PROCESSING ENVIRONMENT," filed on even date herewith, application Ser. No. 08/802,734, the disclosure of which is incorporated herein by reference for all purposes.

BACKGROUND OF THE INVENTION

This invention relates generally to quality-of-service measurement in computer systems and more particularly to a system and method for continuously measuring quality of service in a federated application environment.

Federated application environments are characterized by independent computer systems in individual administrative domains that are loosely coupled by networks and cooperate to provide computing resources for a global application. The extent and capabilities of each administrative domain are usually determined by the network boundaries of each distinct supplier or service provider. Generally, cross-domain access by third parties is severely limited due in part to the lack of well-defined management interfaces and by security restrictions.

The inadequacy of present cross-domain access creates difficulties in identifying and diagnosing problems in distributed applications that must operate in a federated environment, such as Worldwide Web-based information servers and electronic commerce systems. The quality of service received by these applications depends upon many domain-dependent factors, including software subsystems, such as applications, operating system and middleware modules; hardware components, such as processors, clients, servers and disk subsystems; and networking infrastructures. However, cross-domain access restrictions preclude the impact of these factors from being adequately determined by an outsider.

A prior art technique for defining an efficient measurement infrastructure for a performance measurement system for heterogenous distributed environments, including federated environments, is disclosed in R. Friedrich et al., "Integration of Performance Measurement and Modeling for Open Distributed Processing," Int'l Fed. of Info. Proc., Brisbane, Australia (February 1995). The system as disclosed teaches a distributed management system architecture, but fails to define performance metrics or an approach to problem identification and diagnosis for federated environments.

Prior art network management systems are unable to identify and diagnose the causes of quality-of-service failures in federated environments. The primary reason is the unavailability of complete data for identifying and diagnosing problematic areas across administrative domain boundaries. Two management products capable of collecting restricted sets of data on network resource consumption, such as network links, routers and so forth, and on operating system resource consumption, including CPU, memory and disk usage, are the Open View Network Manager and Glance-Plus System Manager, respectively, both products of the Hewlett-Packard Company, Palo Alto, Calif. Moreover, neither of these technologies can provide correlated, end-to-end measurements of client-server or distributed applications and neither can access data collected in another administrative domain.

Therefore, there is a need for a system and method for identifying and diagnosing quality-of-service problems in distributed applications whose components reside in multiple administrative domains. There is a further need for a system and method for measuring quality of service in client-server and distributed applications operating in a federated application environment. There is also a need for a system and method for providing correlated quality-of-service information on local and remote application component performance spanning administrative domain boundaries.

SUMMARY OF THE INVENTION

It is, therefore, an object of the present invention to a system and method for continuously measuring quality of service in a federated application environment. According to the invention, this object is accomplished by measuring distributed component performance using standardized quality-of-service metrics and identifying and diagnosing quality service problems based on information obtained by these metrics. The present invention defines a set of sensors for collecting performance metric data and describes a method for identifying and diagnosing quality-of-service failure points even when data from other administrative domains is incomplete or unavailable.

An embodiment of the present invention is a system and method for measuring quality-of-service in a federated application environment. One or more administrative domains are provided with each administrative domain being interconnected with at least one other administrative domain to form the federated application environment. One or more interconnected network nodes are situated within each administrative domain with each network node including at least one capsule interface within which a managed method is executed. Instrumentation is associated with each capsule interface of each network node with the instrumentation collecting performance data on the managed method being executed within the capsule interface. A count sensor determines a processing time with the instrumentation within the capsule interface for each managed method. A network sensor determines send and receive bandwidth demand information with the instrumentation within the capsule interface for each managed method. A demand sensor determines physical host resource demands as needed to satisfy invocations of the managed method with the instrumentation within the capsule interface for each managed method. An interval sensor determines response times with the instrumentation within the capsule interface for each managed method.

A further embodiment of the present invention is a method for identifying quality-of-service problems in a federated application environment. The federated application environment comprises one or more interconnected network nodes with each being operable to execute a managed method. A throughput rate is determined for the managed method. The managed method is reported as processing too many arrivals if the throughput rate is qualitatively too high. A residence time is determined for clients accessing the managed method if the throughput rate is qualitatively acceptable. Problem diagnosis is performed if the residence time is qualitatively unacceptable.

A further embodiment of the present invention is a measurement system for efficiently measuring the quality of service in a federated application environment. The federated application environment comprises one or more interconnected administrative domains. One or more interconnected network nodes are situated within each administrative domain with an application process operating on each network node. At least one intelligent sensor is associated with each application process with each intelligent sensor including a sensor probe for selectively collecting data about at least one of the network node upon which the associated application process operates or the associated application process. An observer is associated with each application process and includes means for eliminating the transfer of unchanged and zero values from the data collected by the at least one intelligent sensor. A collector is associated with each network node and includes an interface for asynchronously receiving intervalized collected data periodically pushed from the observer. An analyzer associated with the distributed processing environment and includes an interface for asynchronously receiving intervalized collected data periodically pushed from the collector. A set of quality-of-service metrics are provided for use by the analyzer in identifying and diagnosing quality-of-service problems for one such application process operating in the federated environment with each quality-of-service metric based on intervalized collected data.

The foregoing and other objects, features and advantages of the invention will become more readily apparent from the following detailed description of a preferred embodiment of the invention which proceeds with reference to the accompanying drawings.

DETAILED DESCRIPTION

Figure 1:
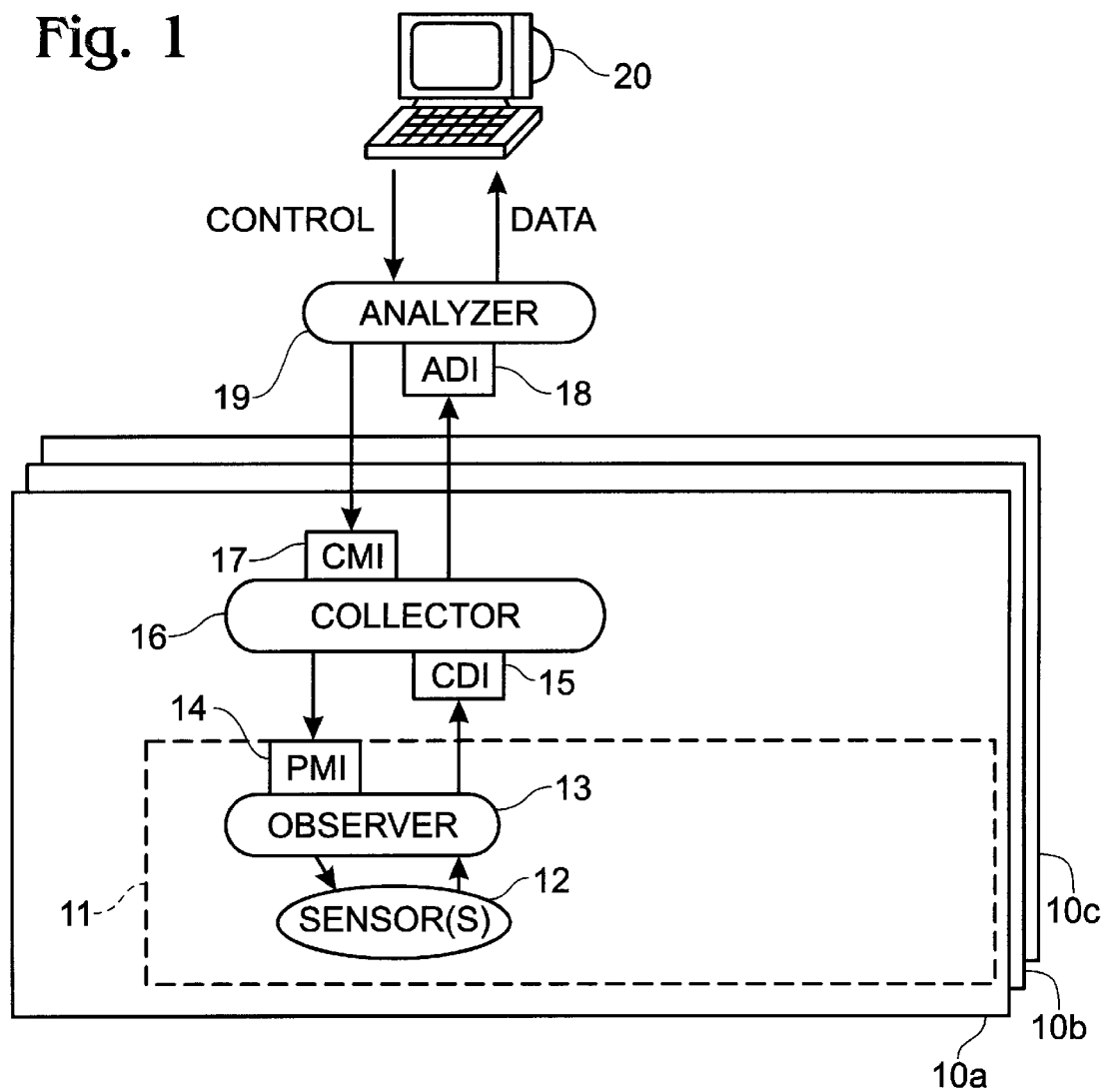
FIG. 1 is a functional block diagram of a system for efficiently monitoring quality of service in a distributed operating environment.

FIG. 1 shows a functional block diagram of a system for efficiently monitoring quality of service in a distributed operating environment for use with the present invention. The system provides, by way of example, a basic quality-of-service software monitoring infrastructure upon which the present invention can operate. However, other monitoring infrastructures would be suitable, subject to the following requirements. First, standard performance metrics must be defined so that metrics collected from heterogeneous sources are or can be made comparable. A performance metric is a unit of measurement applied in a uniform manner throughout all network nodes in a heterogeneous distributed operating environment for obtaining and analyzing the levels of the quality of service and performance received, particularly by managed methods. Second, pervasive instrumentation must be implemented to support the collection of the standard metrics. Third, standard access and control interfaces should be defined that permit the efficient collection and transport of performance data from the collection source to the analysis destination. Fourth, strict limits on collection overhead should be enforced to minimize perturbation of the environment under measure.

In addition to these infrastructure requirements, the present invention is implicitly situated within one of one or more interconnected administrative domains which operate collectively as a federated application environment. A display or similar output device presents collected, correlated performance data on managed methods operating on individual network nodes within each administrative domain in which the pervasive instrumentation has been implemented. Each administrative domain functions independently from yet cooperates with the other administrative domains to collect and disseminate the performance metric data.

Briefly, the system shown in FIG. 1 comprises the following components. A standardized set of performance metrics are measured by instrumentation objects consisting of sensors 12, observers 13, collectors 16 and an analyzer 19. The standardized performance metrics ensure consistent collection and reporting of quality-of-service data across heterogeneous network nodes 10a, 10b, 10c. Each network node 10a, 10b, 10c includes a central processing unit, memory, input/output interface, preferably such as a keyboard and display and network connection interface. An operating system is run by the central processing unit for controlling system resources and executing software in response to user commands. According to the invention, it is preferable to standardize the application programming interfaces 14, 15, 17, 18 used by the instrumentation objects for exchanging control and performance data in an efficient and platform-transparent manner. The analyzer 19 provides a seamless and integrated view of stand-alone and distributed applications operating in a heterogenous environment. The instrumentation objects will now be described in detail.

Each sensor 12 is an instance of a performance metric which accumulates a distributional statistic, such as a count, a summation or interval time, or the variance, skew or n-percentile of a distribution. Quality-of-service data is collected on a per object member function granularity for all capsule 11 interface methods by a sensor "probe" (not shown) and reported at a user-configured frequency. A method is software stored in a computer memory and operable upon execution by a central processing unit. A sensor probe is a platform-dependent software mechanism for requesting raw or system-maintained performance data, such as a function call to the operating system to obtain processor performance data. The performance data is stored in the address space of the local capsule 11. User-definable information level thresholds in each sensor 12 specify the amount and the level of detail of the quality-of-service data collected. To minimize collection overhead, sensors 12 report data only when a threshold condition is true. Each capsule 11 can have several sensors 12.

Each observer 13 periodically "pushes" sensor data from the address space of the local capsule 11 into the collector 16 for the network node 10a. To minimize communication costs, multiple non-zero sensor values are transferred at the same time. A sensor access and control interface, called the Performance Measurement Interface (PMI) 14, is associated with each observer 13 for interfacing to associated sensors 12 within the instrumented capsule 11. Observers 13 also help minimize in-line processing overhead by allowing the sensors 12 to defer some computations and relieves sensors 12 of the need to manage and transmit their collected data. Each capsule 11 has one observer 13.

Each collector 16 is a node-level object for controlling sensors 12 and performing node-level sensor data management. Collectors 16 obtain sensor data from all observers 13 on the node 10a using an asynchronous data transport channel for acquiring sensor data, called the Collector Data Interface (CDI) 15. Each observer 13 periodically "pushes" sensor data to the collector 16 using the CDI 15 which eliminates the need for polling of sensors 12. In turn, the collected data is periodically "pushed" by each collector 16 to the analyzer 19. A transparent network access and sensor control interface, called the Collector Measurement Interface (CMI) 17, is associated with each collector 16 for interfacing to lower-level objects. Each network node 10a preferably has one collector 16, although multiple collectors 16 or no collector 16 are acceptable configurations. For the zero collector 16 configuration, a remote collector (not shown) logically associated with the network node 10a would provide access to the sensor 12. Two or more collectors 16 can be used for improved efficiency.

One or more analyzers 19 analyze the data gathered by collectors 16 by computing the higher moments of the collected data, correlating data from application elements residing on different nodes 10a, 10b, 10c and preparing the data for expert system or human analysis. Each collector 16 periodically "pushes" sensor data collected from observers 13 on each node 10a to an asynchronous data transport channel for acquiring sensor data, called the Analyzer Data Interface (ADI) 19, associated with the analyzer 19 which eliminates the need for polling of collectors 16. Generally, there is one analyzer 19 for the distributed operating environment, although several analyzers 19 can be employed as well.

In the described embodiment, optimization techniques minimize the required processing and network utilization overhead and improve overall scalability. In particular, sensors 12 periodically report summarized, as opposed to immediate, data. Thresholds are used to report only exceptions to the normal executing environment. And non-polling, asynchronous bulk transfer methods are employed by observers 13 and collectors 16 to minimize bandwidth use. An example of a system for efficiently monitoring quality of service in a distributed operating environment suitable for use with the present invention is described in the related, commonly-assigned patent application entitled "SYSTEM AND METHOD FOR EFFICIENTLY MONITORING QUALITY OF SERVICE IN A DISTRIBUTED PROCESSING ENVIRONMENT," referenced hereinabove.

Figure 2A:
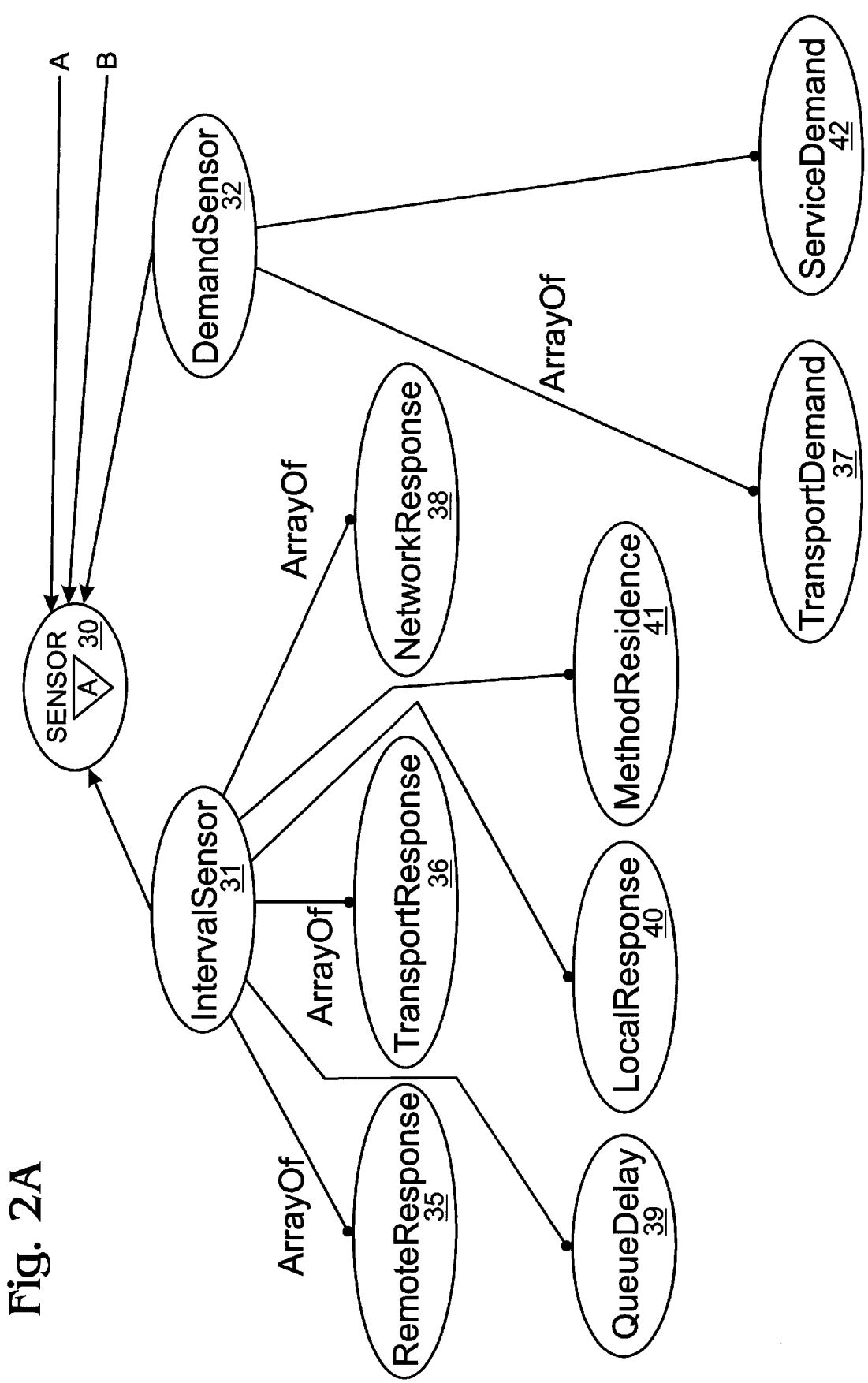
FIGS. 2A and 2B are a class diagram of quality-of-service objects according to the present invention for use in the system of FIG. 1.
Figure 2B:
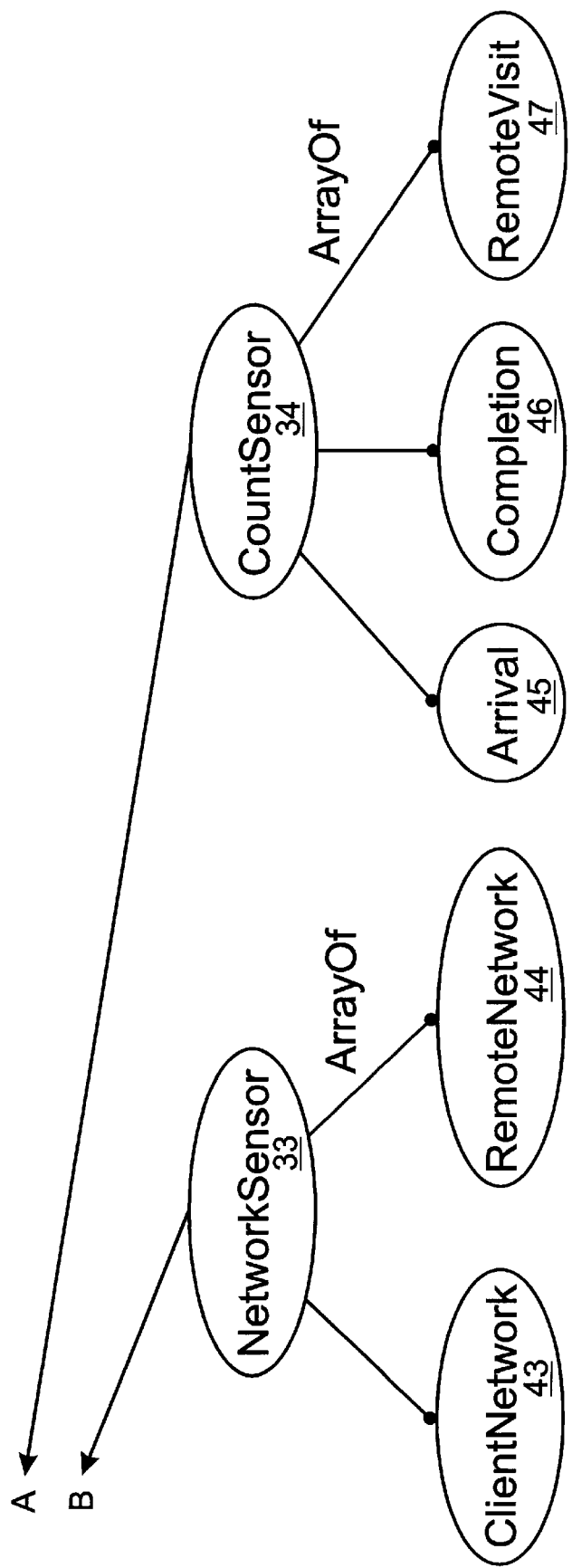

FIGS. 2A and 2B show a class diagram of quality-of-service objects according to the present invention for use in the system of FIG. 1. The quality-of-service objects are implemented as software executable on each computer and include a logical collection of attributes generated by the objects for a particular managed method, that is, a method supported by a capsule interface and monitored by a system, such as the system shown in FIG. 1.

The purpose of these quality-of-service objects is to augment the standardized set of performance metrics for use in a federated application environment. The quality-of-service objects support performance management applications in locating and diagnosing sources of performance problems and building predictive performance models. Using the quality-of-service metrics, a managed method is able to decide, using locally available information, whether it is the cause of poor service or whether some of its remote methods are the cause. This approach is appropriate for federated environments as performance information about a remote method may not be directly available, particularly when the remote method is in a different administrative domain.

The quality-of-service objects need not be implemented as an express part of the monitoring system itself. Rather, the actual objects need only exist within the quality-of-service management application itself so long as the monitoring system provides the raw data upon which the quality-of-service objects operate.

The quality-of-service objects are defined as a class library for an abstract class of type quality-of-service sensor 30, preferably using an object-oriented programming language. There are four subclasses of quality-of-service objects. A queuing or interval sensor subclass (IntervalSensor 31) for response time metrics characterizes the queuing delays of clients requesting service for a managed method. A demand sensor subclass (DemandSensor 32) for service demand metrics characterizes the processor demand and number of disk operations for a managed method. A network sensor subclass (NetworkSensor 33) for bandwidth demand metrics captures the number of network visits and bytes transferred (both received and returned) to a managed method's clients. A count sensor subclass (CountSensor 34) for throughput metrics maintains a running tally of some performance metric under measure. In addition, arrays of interval, demand, network and count sensors are used to characterize the use of methods of remote services invoked by a managed method.

The specific instances of the sensor subclass objects (sensor instances) collect two categories of data: raw data measured directly by a measurement system and deduced data inferred by the management application. The specific instances for raw data collection are summarized below in Table 1. The specific instances for deduced data collection are summarized below in Table 2.

TABLE 1

| Name & Ref. # | Type | Description |
| --- | --- | --- |
| Arrival 45 | CountSensor | Measure method throughput information |
| Completion 46 | CountSensor | Measures correlating method throughput information with RemoteVisit data |
| QueueDelay 39 | IntervalSensor | Measures queuing delay of clients at this managed method |
| ClientNetwork 43 | NetworkSensor | Tallies count information about use of bandwidth demand for interactions with managed method's clients |
| RemoteNetwork 44 | ArrayOfNetworkSensor | Tallies count information about use of bandwidth demand for managed method's interactions with remote capsule interface methods |
| RemoteVisit 47 | ArrayOfCountSensor | Measure throughput information for managed method's requests for service from remote capsule interface methods |
| LocalResponse 40 | IntervalSensor | Measures this method's time at host resources, includes queuing and service demand |
| RemoteResponse 35 | ArrayOfIntervalSensor | Measures response time for this managed method at each of its remote capsule interface methods |

TABLE 1-continued

| Name & Ref. # | Type | Description |
| --- | --- | --- |
| MethodResistance 41 | IntervalSensor | Measures residence time of clients accessing the method |

TABLE 2

| Name & Ref. # | Type | Description |
| --- | --- | --- |
| ServiceDemand 42 | DemandSensor | Measures host resource consumption measures for managed method |
| TransportResponse 36 | ArrayOfIntervalSensor | Measures managed method's elapsed host transport protocol time for interactions with its clients and each of its remote capsule interface methods |
| TransportDemand 37 | ArrayOfDemandSensor | Measures managed method's host transport protocol host resource consumption for interactions with its clients and each of its remote capsule interface methods |
| NetworkResponse 38 | ArrayOfIntervalSensor | Measures managed method's network media time for interactions with each of its remote capsule interface methods (includes network packet switching latencies) |

In the described embodiment, three practical issues arise when capturing the quality-of-service metrics: processing overlap occurring during measurement periods of response times; a problem referred to as delta latencies; and estimating network packet switching latencies from a managed method's node to the node for a remote method. First, measured processing periods sometimes overlap when transport protocol processing, networking interactions and application processing occur in parallel. For simplicity, these actions are assumed not to overlap since even in the worst-case, a method-method interaction would perform little processing relative to transport and network latencies for large message sizes.

Second, delta latencies are a problem often seen in software and hybrid performance monitoring systems. The basic problem is that instrumentation implemented in software will not always execute immediately. Network software, capsule and internal concurrency mechanisms (such as process threads) dispatching delays reduce the precision of software instrumentation measurements and are collectively referred to as delta latencies. For example, MethodResidence 41 should ideally start execution as soon as a request reaches a network node. However, if middleware-based instrumentation is used, execution will not actually start until the capsule 11 receives the request. The delay occurring between the arrival of the request at the node 10a and the delivery of the request to the capsule 11 is a delta latency. In the present invention, a delta instrumentation fix is employed to reduce the worst-case impact of delta latencies whereby the network software is required to return the time that a request or response arrives at a node 10a and the time that the request is delivered to a capsule 11. This extra measurement is needed to ensure more precise measurements by the MethodResidence 41, TransportResponse 36, RemoteResponse 35, and LocalResponse 40 sensor instances.

Third, estimating network packet switching latencies requires the support of the network monitoring system. In practice, it is difficult to measure network latency and transfer times directly because individual network nodes generally tend to have different wall clock times. Thus, the network monitoring system preferably needs to apply a time correction procedure to the packets for providing a uniform estimate of switching latencies.

The sensor instances are divided into four types: throughput metrics; bandwidth demand metrics; service demand metrics; and response time metrics. Each type will now be discussed.

The throughput metrics comprise Arrival 45, Completion 46 and RemoteVisit 47. The purpose of these metrics is to measure capsule method processing times. The times at which Arrival 45 and Completion 46 are updated are subject to delta latencies. However, the latencies do not have a significant impact on management applications. Also, if RemoteVisit 47 is incremented before a request for service, it is not affected by the latencies. Completion 46 is incremented at the time when a response is sent to the network transport subsystem to avoid an overlap of metrics.

The quality-of-service monitoring system shown in FIG. 1 forwards aggregated metrics to the management applications. Thus, to maintain consistency between data collected by Completion 46 and RemoteVisit 47, only RemoteVisit 47 data for completed methods should be included in the forwarded metrics. The difference between the values collected by Arrival 45 and Completion 46 can be used to deduce the number of method invocations spanning reporting periods.

The bandwidth demand metrics comprise ClientNetwork 43 and RemoteNetwork 44. The purpose of these metrics is to capture send and receive bandwidth demand information, including the number of visits (requests) to other nodes on the network and the number of bytes transferred per request. ClientNetwork 43 characterizes bandwidth demand interactions with the method's clients. RemoteNetwork 44 captures interactions with each of the method's remotely accessed methods.

The times at which Network sensors are updated are affected by delta latencies, but the perturbation does not affect the management applications. Some protocols, such as the transmission control protocol/internet protocol (TCP/IP), can actually send more information than can be measured by a system such as shown in FIG. 1. In such cases, the measurements captured by the bandwidth demand metrics are optimistic.

The service demand metrics comprise ServiceDemand 42 and TransportDemand 37. The purpose of these metrics is to capture physical host resource demands as needed to satisfy invocations of the managed method. TransportDemand 37 includes the transport protocol resources needed to receive a request for service, to return the response and to exchange messages with remote methods. ServiceDemand 42 includes all other host resource demands.

It would be ideal to directly measure processor, disk and transport resources as needed by each capsule interface method on a node. Unfortunately, operating system nucleus objects capture information at the capsule level and not at a per service granularity. Moreover, the processing times and disk operation counts allocated to capsules by an operating system nucleus are only estimates. Processing times are typically assigned using sampling techniques and only the capsule executing at the time when an input or output buffer physically interacts with a disk resource gets charged for the disk operation. However, statistical techniques can be used to estimate average resource demand information for each service separately as deduced data by ServiceDemand 42 and TransportDemand 37. Since the computations require data from many reporting periods, they are best done by the management application.

The response time metrics comprise RemoteResponse 35, TransportResponse 36, NetworkResponse 38, QueueDelay 39, LocalResponse 40 and MethodResidence 41. The purpose of these metrics is to measure response times. A client request's residence time at the managed method is estimated using the relationships shown below in equation 1:

$$\text{MethodResidence 41} \approx \text{TransportResponse 36} + \text{QueueDelay 39} + \text{LocalResponse 40} + \text{NetworkResponse 38} + \text{RemoteResponse 35} \quad (1)$$

Figure 3:
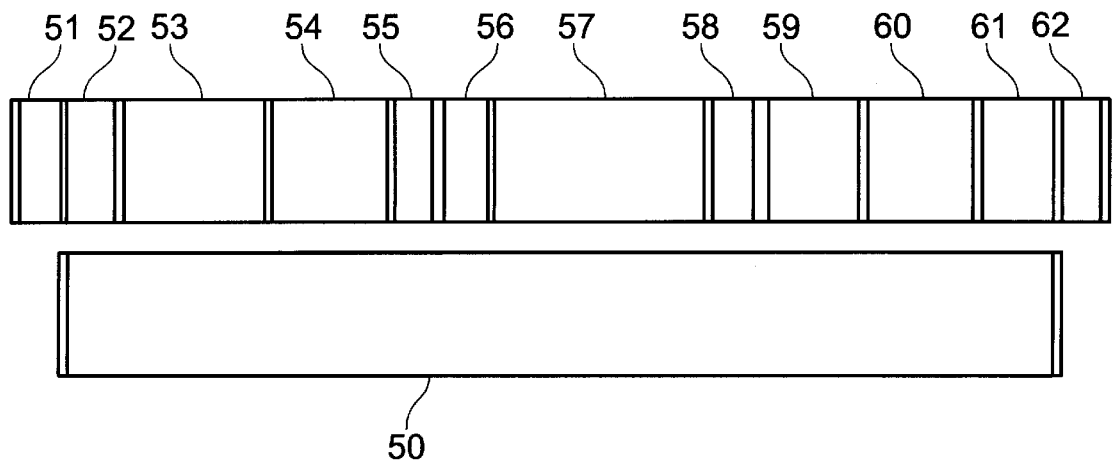
FIG. 3 is, is a bar graph, by way of example, illustrating the relationship between response time metrics of FIGS. 2A and 2B.

FIG. 3 shows, by way of example, a bar graph illustrating the relationship between the response time metrics. MethodResidence 41 starts when a request arrives at the managed method's node and ends after the response is delivered to the network (block 50). The network time required by the client to forward the request to the managed method's node and to exchange data through the network to the client is not included (blocks 51 and 62).

TransportResponse 36 measures all transport protocol response time for receiving requests (block 52), returning results (blocks 61) and requesting services (block 55) and receiving results (block 59) from each remote method. It characterizes the use of transport resources for accepting the request and issuing requests to each remote method separately. Transport time includes the elapsed time spent moving messages from the network to the capsule (block 52) and messages from the capsule to the network (block 61).

QueueDelay 39 measures queueing delays for clients attempting to access the managed method (block 53). The queueing delay starts once the request is forwarded to the capsule by the transport subsystem and ends when the managed method begins to execute.

LocalResponse 40 captures service demand and queueing time for access to local host resources. It begins when the request is associated with an execution thread and completes when the result is submitted to the transport system (blocks 54 and 60). It uses sensors to exclude time spent waiting for service from methods of remote services.

NetworkResponse 38 measures the time required for a request to flow from the managed method's node through the interconnection network to the remote method's node (blocks 56 and 58). It does not include transport protocol costs but does include the time the message spends passing through internet or telecommunication system internetworks.

RemoteResponse 35 characterizes the MethodResidence 41 time for remote methods used by the managed method (block 57). It does not include the managed method's TransportResponse 36 or NetworkResponse 38 for the remote method. RemoteResponse 35 characterizes each of the remote methods separately and requires an estimate for NetworkResponse 38 and measurements from TransportResponse 36.

As described further hereinbelow with reference to FIGS. 4A and 4B, this choice of quality-of-service metrics simplifies the task of locating and diagnosing sources of performance problems. In particular, the definition of RemoteResponse 35 provides an estimate of the remote method's MethodResidence 41 and can be used to evaluate the quality of service received by the managed method as a client. The remote method's residence time is not ordinarily measured by service providers which only consider the aggregate quality of service provided for all of its clients.

Several problems might occur during the measurement of these metrics. First, capturing TransportResponse 36 times while sending information might be difficult for connection-oriented interactions if information is not sent immediately, such as when the TCP/IP TCP_NODELAY socket option is used as a means to reduce latency. Furthermore, a connection might be multiplexed to support the concurrent interaction between several pairs of methods in cooperating capsules. In this case, instrumentation might not be able to deduce the context of the measurements that should be updated.

Moreover, the transport, network and application processing of a request can take place concurrently. As a result, TransportResponse 36 values from participating nodes, NetworkResponse 38 values and possibly the client and server LocalResponse 40 values (for large messages) could account for times that overlap. Treating the network and transport times as a sum of request roundtrip times gives a pessimistic bound on the total roundtrip time. An estimate for determining NetworkResponse 38 values might need the support of the network management subsystem. If these values cannot be estimated, RemoteResponse 35 can include its measurement and the network response time will be considered as part of the remote service provider's service time. The number of NetworkResponse 38 values increases with the number of intermediate networking switches and with distance.

These measurement problems are most severe when capsule interface methods require little processing. If the methods require disk operations or processing that takes several times longer than the network transport and communication time, the precision of the measurements should be acceptable. A delta latency instrumentation fix is required to ensure useful response and residence time measures.

Figure 4A:
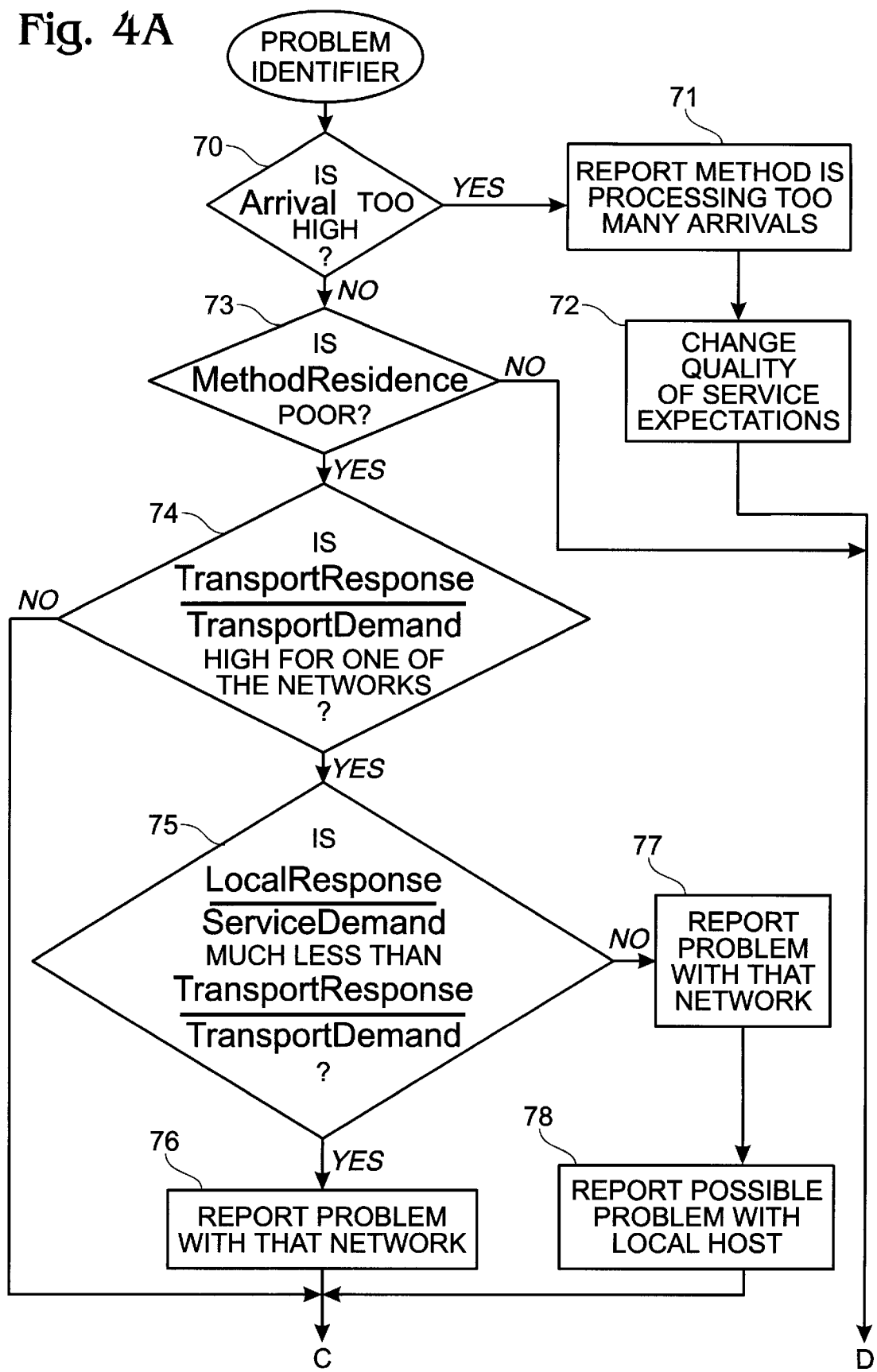
FIGS. 4A and 4B are a flow diagram of a method for identifying and diagnosing sources of quality-of-service problems employing the quality-of-service objects of FIGS. 2A and 2B.
Figure 4B:
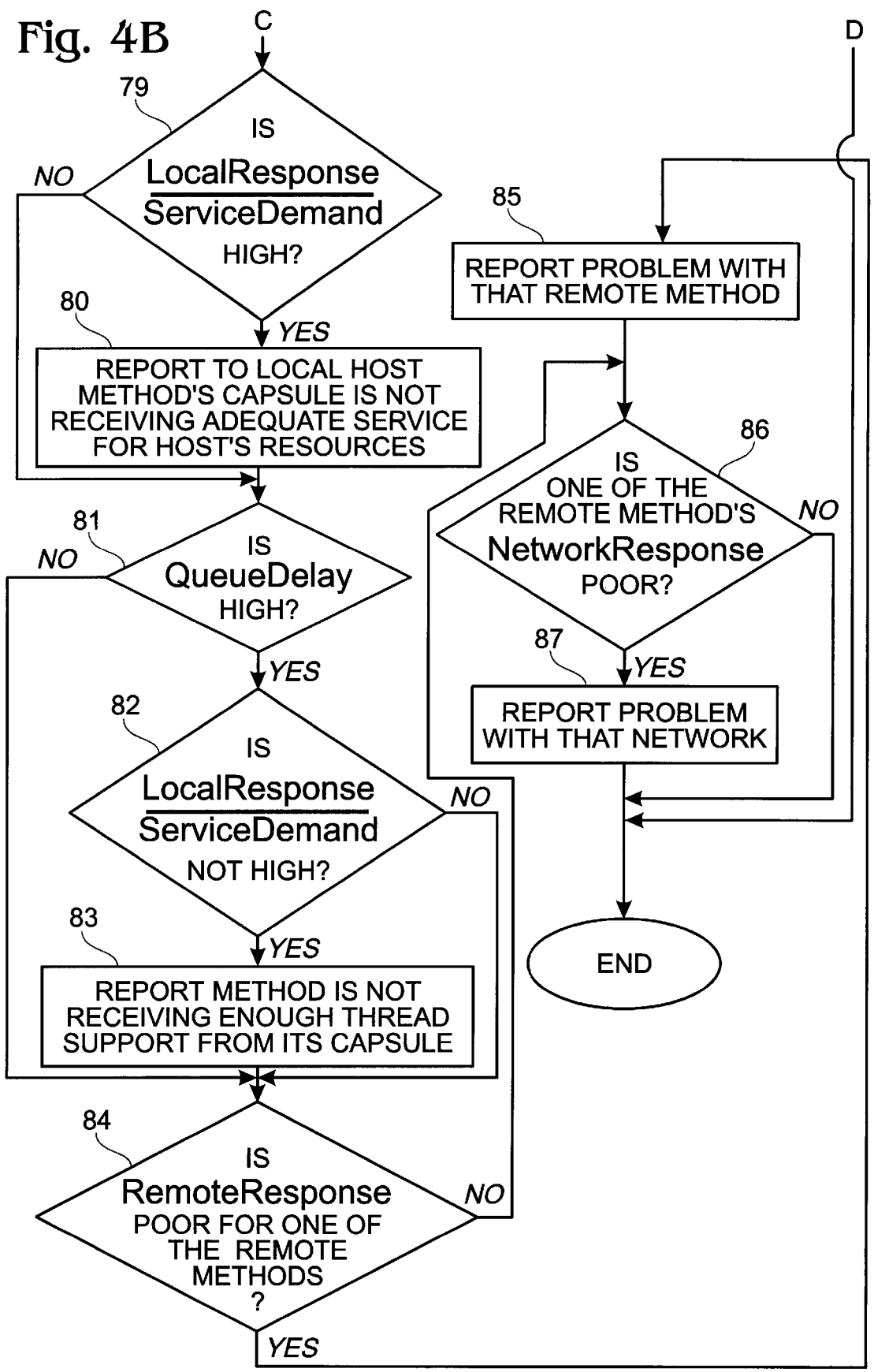

FIGS. 4A and 4B show a flow diagram of a method for identifying and diagnosing sources of quality-of-service problems employing the quality-of-service objects of FIGS. 2A and 2B. The quality-of-service method is executed by the quality-of-service management application and identifies likely quality of service and performance concerns using pre-determined qualitative measures. The management application can correlate measures from objects in the same administrative domain or report problems to other administrative domains.

The quality-of-service method begins by determining the throughput information for the managed method, Arrival 45. If Arrival 45 is qualitatively too high (block 70), the managed method is reported as processing too many arrivals (block 71), the quality-of-service expectations are changed accordingly (block 72) and the quality-of-service method terminates. Otherwise, if Arrival 45 is not qualitatively too high (block 70), the quality-of-service method determines the residence time of clients accessing the managed method, MethodResidence 41 using the response time metrics and equation 1, described hereinabove with reference to FIG. 3.

If MethodResidence 41 is qualitatively acceptable, no further action is needed and the quality-of-service method terminates. Otherwise, if MethodResidence 41 is qualitatively poor (block 73), the quality-of-service requirements are being violated and the quality-of-service method must attempt to identify and diagnose as many problems as possible.

The quality-of-service method first determines the ratio between the managed method's elapsed host transport protocol time for interactions with its clients and each of its remote capsule interface methods, TransportResponse 36, to the managed method's host transport protocol host resource consumption for interactions with its clients and each of its remote capsule interface methods, TransportDemand 37. If the TransportResponse 36 to TransportDemand 37 ratio is qualitatively high for one of the networks (block 74), transport problems might exist in either the local host's responsiveness or that particular network. Consequently, the quality-of-service method determines the ratio between this method's time at host resources, LocalResponse 40, to the host resource consumption measures for the managed method, ServiceDemand 42. This ratio is compared to the TransportResponse 36 to TransportDemand 37 ratio. If the LocalResponse 40 to ServiceDemand 42 ratio is qualitatively much less than the TransportResponse 36 to TransportDemand 37 ratio (block 75), adequate host responsiveness is being received and the problem is reported as occurring with the network (block 76). Otherwise, if the LocalResponse 40 to ServiceDemand 42 ratio is qualitatively greater than or equal to the TransportResponse 36 to TransportDemand 37 ratio (block 75), the problem is reported as occurring with either that network (block 77) or the local host (block 78). If the TransportResponse 36 to TransportDemand 37 ratio is qualitatively acceptable (block 74), the next type of problem is examined.

Next, the quality-of-service method examines the LocalResponse 40 to ServiceDemand 42 ratio (as determined in block 75) by itself. If the LocalResponse 40 to ServiceDemand 42 ratio is qualitatively high (block 79), the managed method is taking too long to get service from the host and the local host method's capsule is reported as not receiving adequate service from the host's resources (block 80). Otherwise, if the LocalResponse 40 to ServiceDemand 42 ratio is qualitatively acceptable (block 79), the next type of problem is examined.

Next, the quality-of-service method determines the queuing delay of clients at this managed method, QueueDelay 39. If QueueDelay 39 is qualitatively high (block 81), the quality-of-service method needs to check for a problem in receiving internal concurrency service. Thus, if the LocalResponse 40 to ServiceDemand 42 ratio (as determined in block 75) is qualitatively not high (block 82), there is a problem with receiving support for increasing internal concurrency and the managed method is reported as not receiving enough internal concurrency support from its capsule (block 83). Otherwise, if QueueDelay 39 is qualitatively acceptable (block 81) or if the LocalResponse 40 to ServiceDemand 42 ratio is qualitatively acceptable (block 82), the next type of problem is examined.

Next, the quality-of-service method determines the response time for this managed method at each of its remote capsule interface methods, RemoteResponse 35. If RemoteResponse 35 is qualitatively poor for one of the remote methods (block 84), some remote method is not providing this client with adequate service and the problem is reported as occurring with that remote method (block 85). Otherwise, if RemoteResponse 35 is qualitatively acceptable (block 84), the next type of problem is examined.

Finally, the quality-of-service method determines the managed method's network media time for interactions with each of its remote capsule interface methods, including network packet switching latencies, NetworkResponse 38. If one of the remote method's NetworkResponse 38 is qualitatively poor (block 86), some network is not providing this client with adequate service and a problem is reported with that network (block 87). Otherwise, if each of the remote method's NetworkResponse 38 is qualitatively acceptable (block 86), the quality-of-service method terminates.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. A method for continuously measuring quality-of-service for a federated application environment having a plurality of interconnected network nodes, each network node including at least one capsule interface within which a managed method and instrumentation are executed, the method comprising:

determining throughput metrics by measuring processing times with the instrumentation within the capsule interface for each managed method, wherein the managed methods executed in the nodes together form a distributed application, wherein one of the throughput metrics is incremented when a response is sent to a network transport subsystem to avoid an overlap of metrics, wherein one of the throughput metrics is incremented before a request for service such that the metric is not affected by delta latencies;

determining bandwidth demand metrics by capturing send and receive bandwidth demand information with the instrumentation within the capsule interface for each managed method;

determining service demand metrics by capturing physical host resource demands as needed to satisfy invocations of the managed method with the instrumentation within the capsule interface for each managed method; and determining response time metrics by measuring response times with the instrumentation within the capsule interface for each managed method.

2. A method according to claim 1, wherein the step of determining the throughput metrics further comprises the steps of:

measuring method throughput information with a count sensor into an arrival metric object;

measuring correlating method throughput information with a count sensor using service information for managed methods executed by remote capsule interfaces into a completion metric object; and measuring throughput information with an array of count sensors for requests of the managed method for service from remote capsule interface methods into an array of remote visit metric objects.

3. A method according to claim 2, wherein the step of determining the bandwidth demand metrics further comprises the steps of:

determining count information with a network sensor for measuring use of bandwidth demand for interactions with clients of the managed method into a client network metric object; and determining count information with an array of network sensors on use of bandwidth demand for interactions of the managed method with managed methods which are executing on remote capsule interfaces into an array of remote network metric objects.

4. A method according to claim 2, wherein the step of determining the service demand metrics further comprises the steps of:

measuring host resource consumption with a demand sensor for the managed method into a service demand metric object; and measuring host transport protocol host resource consumption by the managed method with an array of demand sensors for interactions with clients of the managed method and each remote capsule interface methods of the managed method into an array of transport demand metric objects.

5. A method according to claim 2, wherein the step of determining the response time metrics further comprises the steps of:

measuring response time with an array of interval sensors for the managed method at each remote capsule interface method of the managed method into an array of remote response metric objects;

measuring elapsed host transport protocol time of the managed method with an array of interval sensors for interactions by the managed method with clients of the managed method and each remote capsule interface method of the managed method into an array of transport response metric objects;

measuring network media time of the managed method with an array of interval sensors for interactions by the managed method with each remote capsule interface method of the managed method into an array of network response metric objects;

measuring queueing delay of clients at the managed method with an interval sensor into a queue delay metric object;

measuring time at host resources for the managed method with an interval sensor into a local response metric object; and measuring residence time of clients accessing the managed method with an interval sensor into a method residence metric object.

6. A method for identifying quality-of-service problems in a federated application environment, the federated application environment comprising one or more interconnected network nodes, each being operable to execute a managed method, comprising the steps of:

determining a throughput rate for the managed method by measuring processing times, wherein all managed methods executed in the nodes together form a distributed application, wherein the throughput rate is incremented when a response is sent to a network transport subsystem to avoid processing overlap, wherein the throughput rate is incremented before a request for service such that the rate is not affected by delta latencies;

reporting that the managed method is processing too many arrivals if the throughput rate is qualitatively too high;

determining a residence time for clients accessing the managed method if the throughput rate is qualitatively acceptable; and performing problem diagnosis if the residence time is qualitatively unacceptable.

7. A method according to claim 6, further comprising the steps of:

determining a transport response to transport demand ratio, the transport response comprising a measurement of elapsed host transport protocol times for interactions by the managed method with clients of the managed method and with each managed method of remote interface capsules, the transport demand comprising a measurement of host transport protocol resource consumption for interactions by the managed method with clients of the managed method and with each managed method of remote interface capsules; and identifying a problem with a network upon which the managed method operates if the transport response to the transport demand ratio is qualitatively high.

8. A method according to claim 7, wherein the step of identifying a problem further comprising the steps of:

determining local response to service demand ratio, the local response comprising a measurement of time spent by the managed method using resources of a local host network node, the service demand comprising a measurement of resource consumption by the manage method of the local host network node;

comparing the transport response to transport demand ratio to the local response to service demand ratio; and reporting a problem with the local host network node upon which the managed method operates if the local response to the service demand ratio is qualitatively less than the transport response to the transport demand ratio.

9. A method according to claim 6, further comprising the steps of:

determining a local response to service demand ratio, the local response comprising a measurement of time spent by the managed method using resources of a local host network node, the service demand comprising a measurement of resource consumption by the manage method of the local host network node; and reporting a problem with an interface capsule of the managed method not receiving adequate service from resources of the local host network node if the local response to the service demand ration is qualitatively too high.

10. A method according to claim 6, further comprising the steps of:

determining a queueing delay of clients using the managed method; and identifying a problem with the managed method if the queueing delay is qualitatively too high.

11. A method according to claim 10, where in the step of identifying a problem further comprises the steps of:

determining a local response to service demand ratio, the local response comprising a measurement of time spent by the managed method using resources of a local host network node, the service demand comprising a measurement of resource consumption by the manage method of the local host network node; and reporting a problem with the managed method not receiving sufficient internal concurrency support from a capsule interface of the managed method.

12. A method according to claim 6, further comprising the steps of:

determining a remote response for the managed method for a further managed method at a remote capsule interface of the managed method; and reporting a problem with one such further managed method if the remote response is qualitatively poor for the further managed method.

13. A method according to claim 6, further comprising the steps of:

determining a network response for a network media time of the managed method for interactions with a further managed method at a remote capsule interface of the managed method; and reporting a problem with a network upon which one such further managed method is situated if the network response is qualitatively poor.

14. A quality-of-service measurement system for a federated application environment having a plurality of interconnected network nodes and managed methods, each operating on one of the nodes, the system comprising:

a plurality sets of instrumentation, each set associated with one of the nodes to collect performance data on a managed method executed within the associated node, wherein all the managed methods together form a distributed application, wherein the instrumentation sets further comprise a delta instrumentation fix to reduce the impact of delta latencies on execution of the instrumentation sets;

a plurality of quality-of-service objects executable on each of the nodes to measure quality-of-service of a managed method within its associated node based on a standardized set of quality-of-service metrics and the performance data collected by the instrumentation for the managed method, wherein the quality-of-service objects cause one of the metrics to be incremented when a response is sent to a network transport subsystem so as to avoid an overlap of metrics, wherein the quality-of-service objects also cause one of the metrics to be incremented before a request for service such that the metric is not affected by delta latencies.

15. The quality-of-service measurement system of claim 14, wherein the quality-of-service objects comprise a count sensor object that determines a processing time of the managed method based on the standardized set of quality-of-service metrics and the collected data;

a network sensor object that determines send and receive bandwidth demand information of the managed method based on the standardized set of quality-of-service metrics and the collected data;

a demand sensor object that determines physical host resource demands as needed to satisfy invocations of the managed method based on the standardized set of quality-of-service metrics and the collected data;

an interval sensor object that determines response times of the managed method based on the standardized set of quality-of-service metrics and the collected data.

16. The quality-of-service measurement system of claim 15, wherein the count sensor object further comprise an arrival metric object that measures method throughput information;

a completion metric object that measures correlating method throughput information with service information of remote managed methods of the managed method;

a remote visit metric object that measures throughput information for requests of the managed method for service from remote managed methods of the managed method.

17. The quality-of-service measurement system of claim 15, wherein the network sensor object further comprises a client network metric object that determines count information regarding use of bandwidth demand for interaction with clients of the managed method;

a remote network metric object that determines count information regarding use of bandwidth demand for interaction with remote methods of the managed method.

18. The quality-of-service measurement system of claim 15, wherein the demand sensor object further comprises a service demand metric object that measures host transport protocol host resource consumption of the managed method for interactions with clients of the managed method and remote methods of the managed method.

19. The quality-of-service measurement system of claim 15, wherein the interval sensor object further comprises a remote response metric object that measures response time for the managed method at each remote method of the managed method;

a transport response metric object that measures elapsed host transport protocol time of the managed method for interactions by the managed method with clients of the managed method and with each remote method of the managed method;

a network response metric object that measures network media time of the managed method for interactions by the managed method with each remote method of the managed method;

a queue delay metric object that measures queuing delay of clients at the managed method;

a local response metric object that measures time at host resources for the managed method; and a method residence metric object that measures residence time of clients accessing the managed method.

* * * * *